US012393624B2

(12) United States Patent
Baxter

(10) Patent No.: US 12,393,624 B2
(45) Date of Patent: Aug. 19, 2025

(54) OPTIMIZED EMBEDDING SEARCH

(71) Applicant: Shopify Inc., Ottawa (CA)

(72) Inventor: Daniel Baxter, Stittsville (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 18/471,445

(22) Filed: Sep. 21, 2023

(65) Prior Publication Data
US 2025/0103632 A1    Mar. 27, 2025

(51) Int. Cl.
*G06F 16/334* (2025.01)
*G06F 40/279* (2020.01)

(52) U.S. Cl.
CPC ........ *G06F 16/3347* (2019.01); *G06F 40/279* (2020.01)

(58) Field of Classification Search
CPC ............................ G06F 16/3347; G06F 40/279
USPC .......................................................... 707/741
See application file for complete search history.

(56) References Cited

U.S. PATENT DOCUMENTS

| | | | | |
|---|---|---|---|---|
| 11,386,161 B1* | 7/2022 | Gupta | ..................... | G06Q 50/40 |
| 11,756,049 B1* | 9/2023 | Shankar | ............. | G06Q 30/0206 |
| | | | | 705/7.35 |
| 2011/0258227 A1* | 10/2011 | Lacasse | .................. | G06F 16/93 |
| | | | | 707/769 |
| 2017/0011289 A1* | 1/2017 | Gao | ...................... | G06F 40/268 |
| 2020/0250537 A1* | 8/2020 | Li | .......................... | G06F 16/538 |
| 2022/0292123 A1* | 9/2022 | Hoppe | .................... | G06F 16/35 |
| 2023/0315766 A1* | 10/2023 | Cho | ..................... | G06F 16/3338 |
| | | | | 707/722 |
| 2024/0037326 A1* | 2/2024 | Vargas | .................. | G06F 40/194 |

OTHER PUBLICATIONS

Helmers L, Horn F, Biegler F, Oppermann T, Müller KR. Automating the search for a patent's prior art with a full text similarity search. PLoS One. Mar. 4, 2019;14(3):e0212103. doi: 10.1371/journal.pone.0212103. PMID: 30830911; PMCID: PMC6398827. (Year: 2019).*
Reimers, N. et al., "Sentence-BERT: Sentence Embeddings using Siamese BERT-Networks," arXiv:1908.10084v1 [cs. CL], Aug. 27, 2019, 11 pages.

* cited by examiner

*Primary Examiner* — Michael Pham
(74) *Attorney, Agent, or Firm* — Withrow & Terranova, PLLC

(57) ABSTRACT

Systems and methods are disclosed for an embedding search that are optimized, e.g., for a "find similar" or "more like this" search. In one embodiment, a computer-implemented method comprises receiving a request to find data records in a collection of data records that are similar to a particular data record, determining that the particular data record is not included in a model comprising data indicative of similar data records among the collection based on embeddings of data records in the collection, and, responsive thereto, generating at least one embedding of the particular data record and searching the model for a subset of the collection that are similar to the particular data record, based on the at least one embedding. The method further comprises providing a response to the request comprising at least some of the similar data records.

20 Claims, 5 Drawing Sheets

OPTIMIZED EMBEDDING SEARCH

TECHNICAL FIELD

The present disclosure relates to embedding-based search.

BACKGROUND

Searching is a fundamental component of nearly all web-based and software-based environments. With the massive amounts of data available in many environments, which ranges from text to images to videos, there is a need for search techniques that return the most significant results while at the same time return the results in a very short amount of time.

SUMMARY

Systems and methods are disclosed for an embedding search that are optimized, e.g., for a "find similar" or "more like this" search. In one embodiment, a computer-implemented method comprises receiving a request to find data records in a collection of data records that are similar to a particular data record and determining that the particular data record is not included in a model comprising data indicative of similar data records among the collection of data records based on embeddings of data records in the collection of data records, wherein an embedding of a data record is a vector representation of one or more components of the data record. The method further comprises, responsive to determining that the particular data record is not included in the model, generating at least one embedding of the particular data record and searching the model for a subset of the collection of data records that are similar to the particular data record, based on the at least one embedding of the particular data record. The method further comprises providing a response to the request, the response comprising one or more data records from the subset of the collection of data records that are similar to the particular data record. In this manner, embedding search of the collection of data records for data records that are similar to a new or updated data record can be performed even if the new or updated data record is not yet represented in the embedding-based model utilized for the search. This in turn enables infrequent batch processing of new or updated data records for embeddings generation and model update, which is less costly than frequent embedding generation and model update each time a new data record is added or an existing data record is updated.

In one embodiment, the method further comprises caching the at least one embedding of the particular data record. In one embodiment, the method further comprises receiving a second request to find data records in the collection of data records that are similar to the particular data record and determining that the particular data record is not included in the model. The method further comprises, responsive to determining that the particular data record is not included in the model, determining that the at least one embedding of the particular data record is cached and, responsive to determining that the at least one embedding of the particular data record is cached, searching the model for a subset of the collection of data records that are similar to the particular data record, based on the at least one cached embedding of the particular data record. The method further comprises providing a response to the second request, the response comprising one or more data records from the subset of the collection of data records that are similar to the particular data record. In one embodiment, the method further comprises performing a batch process that generates embeddings for a set of data records that are either new to the collection of data records or updated versions of data records already included in the collection of data records and updates the model to include the set of data records based on the embeddings generated for the data records in the set of data records and deleting the at least one embedding of the particular data record from cache, in association with performing the batch process.

In one embodiment, the method further comprises, responsive to determining that the particular data record is not included in the model, performing a keyword search to identify an initial subset of the collection of data records that, based on the keyword search, have at least a threshold degree of similarity to the particular data record and providing an initial response to the request, the initial response comprising one or more of the initial subset of the collection of data records that, based on the keyword search, have at least a threshold degree of similarity to the particular data record. Performing the keyword search and providing the initial response to the request are completed prior to completion of generating the at least one embedding of the particular data record.

In one embodiment, the model is a hierarchical nearest neighbor graph that indicates, based on the embeddings of the data records in the collection of data records, nearest neighbors for each of the data records in the collection of data records.

In one embodiment, each data record in the collection of data records and the particular data record comprises one or more data components, the one or more data components comprising a text component, an image component, or both a text component and an image component.

In one embodiment, each data record in the collection of data records and the particular data record comprises both a text component and an image component. In one embodiment, the model is a first model comprising data indicative of similar data records among the collection of data records based on embeddings of the text components of data records in the collection of data records, and the at least one embedding of the particular data record consists of an embedding of the text component of the particular data record. In another embodiment, the model is a first model comprising data indicative of similar data records among the collection of data records based on embeddings of the image components of data records in the collection of data records, and the at least one embedding of the particular data record consists of an embedding of the image component of the particular data record. In another embodiment, the model is a first model comprising data indicative of similar data records among the collection of data records based on both embeddings of the image components of data records in the collection of data records and embeddings of the text components of data records in the collection of data records, and the at least one embedding of the particular data record consists of both an embedding of the image component of the particular data record and an embedding of the text component of the particular data record. In another embodiment, the model comprises a first sub-model comprising data indicative of similar data records among the collection of data records based on embeddings of the text components of data records in the collection of data records and a second sub-model comprising data indicative of similar data records among the collection of data records based on embeddings of the image components of data records in the collection of data records, the at least one embedding of the particular data record consists of an embedding of the text component of the particular data record, and searching the model for the subset of the collection of data records that are similar to the particular data record comprises searching the first sub-model, based on the embedding of the text component the particular data record. In another embodiment, the model comprises a first sub-model comprising data indicative of similar data records among the collection of data records based on embeddings of the text components of data records in the collection of data records and a second sub-model comprising data indicative of similar data records among the collection of data records based on embeddings of the image components of data records in the collection of data records, the at least one embedding of the particular data record consists of an embedding of the image component of the particular data record, and searching the model for the subset of the collection of data records that are similar to the particular data record comprises searching the second sub-model, based on the embedding of the image component the particular data record. In another embodiment, the model comprises a first sub-model comprising data indicative of similar data records among the collection of data records based on embeddings of the text components of data records in the collection of data records and a second sub-model comprising data indicative of similar data records among the collection of data records based on embeddings of the image components of data records in the collection of data records, the at least one embedding of the particular data record consists of both an embedding of the text component of the particular data record and an embedding of the image component of the particular data record, and searching the model for the subset of the collection of data records that are similar to the particular data record comprises both searching the first sub-model based on the embedding of the text component the particular data record and searching the second sub-model based on the embedding of the image component the particular data record.

Corresponding embodiments of a computing system operable to perform the aforementioned method are also disclosed.

BRIEF DESCRIPTION OF THE DRAWINGS

Embodiments will be described, by way of example only, with reference to the accompanying figures wherein.

Like reference numerals are used in the drawings to denote like elements and features.

DETAILED DESCRIPTION OF EMBODIMENTS

Figure 1:
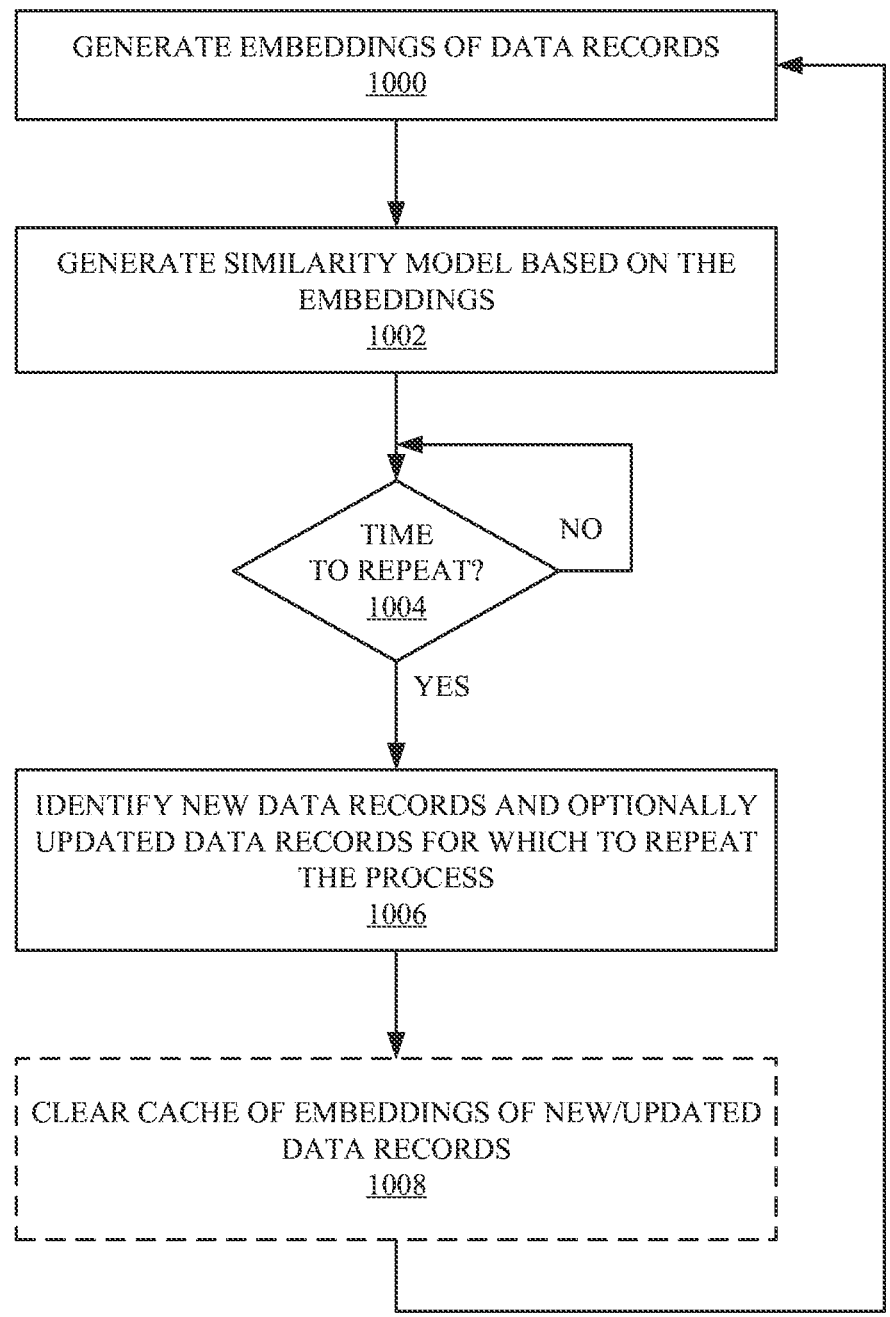
FIG. 1 is a flowchart that illustrates a computer-implemented process for generating embeddings of data records in a collection of data records and generating a data representation, which is referred to herein as a "similarity model," of the similarity of different data records in the collection, in accordance with an embodiment of the present disclosure.

Systems and methods are disclosed for an embedding-based search for finding similar data records among a collection of data records in a web-based or software-based environment. More specifically, embodiments of the present disclosure relate to a "find similar" or "more like this" embedding-based search where one or more embeddings of a particular data record are used as a query for an embedding-based search of the collection of data records to obtain search results that include a subset of data records in the collection that are most similar to the particular data record. The collection of data records may be any collection of text-based data records, image-based data records, video-based data records, or the like, or any combination thereof, for which a search feature that enables searching of the collection is desirable. Some non-limiting examples of a collection of data records include, but are not limited to:

a collection of data records that represent products (e.g., clothing items, jewelry, shoes, etc.) sold via an e-commerce platform, where the data records are, for example, corresponding product webpages which may include text descriptions of the products and/or images of the products;
  a collection of data records that represent documents available via a web-based or software-based platform, where each data record is a corresponding document that contains text and optionally other content such as, e.g., images;
  a collection of data records that represent digital images available via a web-based or software-based platform, where each data record is a corresponding digital image;
  a collection of data records that represent digital audio items (e.g., songs, music albums, playlists, or the like) available via a web-based or software-based platform, where each data record is a corresponding digital audio item; and
  a collection of data records that represent digital video items (e.g., movies, television shows, video clips, user-created videos, or the like) available via a web-based or software-based platform, where each data record is a corresponding digital video item.

Before describing embodiments of the present disclosure in more detail, a brief description of embedding-based searching is beneficial. An "embedding" is a set (e.g., vector or multi-dimensional vector) of numerical values that form a numerical representation of one or more features of the data contained in a data record. Normally, an Artificial Intelligence (AI) model(s) is trained based on a large number of data records to output, for a given input data record, a corresponding embedding that represents the data contained in the data record. For example, there are existing AI models that take text (e.g., a sentence or paragraph) as an input and transform the text into a multi-dimensional vector that serves as a numerical representation of the text. Similar AI models can be trained to generate embeddings of digital images, embeddings of data that contains both text and image(s), or embeddings of videos.

For a conventional embedding-based text search, a collection of text-based data records is processed to use an appropriate AI model to generate an embedding for each text-based data record. Then, when a user desires to search this collection of text-based data records, the user inputs a text string as a query for the search. An AI model is then used to generate an embedding for this text string, and the resulting embedding is compared to the embeddings of the text-based data records in the collection to identify the text-based data records for which the corresponding embeddings are most similar to the embedding of the text query. The identified text-based data records are returned to the user as the search results.

One issue with the existing embedding-based text search is that it is less than optimal if used for a "find similar" or "more like this" search. In particular, generating embeddings is costly in terms of computing resources and takes a significant amount of time when considering that a user would like to receive search results almost instantaneously. As such, there is a need for systems and methods for an embedding-based search that is optimized for a "find similar" or "more like this" search.

Note that, as used herein, the terms "find similar search" or "more like this search" are used interchangeably and further encompass any such search regardless of the particular name given to the type of search.

Now, a detailed description of embodiments of the present disclosure will be provided. In general, a computer-implemented batch process for generating embeddings of data records in a collection of data records and generating a data representation, which is referred to herein as a "similarity model," of the similarity of different data records in the collection is provided. In addition, a computer-implemented embedding search procedure is provided which is optimized for a "find similar" or "more like this" search, particularly for a scenario in which a search may be initiated for a data record that has not yet been processed by the batch process and, therefore, is not represented in the similarity model.

In this regard, FIG. 1 is a flowchart that illustrates a computer-implemented process for generating embeddings of data records in a collection of data records and generating a data representation, which is referred to herein as a "similarity model," of the similarity of different data records in the collection, in accordance with an embodiment of the present disclosure. The procedure of FIG. 1 may be implemented by a server computer, implemented by multiple server computers that operate together to provide the described functionality, or implemented as one or more virtual machines or the like that execute on any suitable hardware platform.

As illustrated, embeddings of data records in a collection of data records are generated and stored (step 1000). The embeddings of the data records may be generated using any suitable technique such as, e.g., one or more trained AI models. Further, for each data record, there may be one or more embeddings generated for that data record. For example, if the data record includes both text and an image, a first embedding may be generated for the text using an appropriate AI model for generating embeddings based on text, and a second embedding may be generated for the image using an appropriate AI model for generating embeddings based on images. Likewise, if the data record includes multiple images, a separate embedding may be generated for each image. As another example, a single embedding may be generated for each data record even if the data record includes multiple data types (e.g., both text and images) using an appropriate AI model for generating embeddings of data that includes a combination of text and images.

Note that there are many existing AI models that can be used to generate embeddings for different types of data (e.g., text, images). Some examples of AI models that can be used to generate embeddings for text include the Universal Sentence Encoder (USE), any of the OpenAI embedding models (e.g., the "text-embedding-ada-002" model) and the Azure Open AI model. An example of an AI model that can be used to generate embeddings for images is that available via Vertex AI. Any such AI model or any similar future AI model may be used to generate the embeddings of the data records in the collection.

A model or other data representation is generated that represents, based on the embeddings of the data records, the degree of similarity of the data records in the collection (step 1002). This model or other data representation is sometimes referred to herein as a "similarity model." In one embodiment, this model is a hierarchical nearest neighbor graph that represents the degree of similarity of data records in the collection based on their embeddings. For example, for each data record, the corresponding embedding represents a point in a multi-dimensional space, and the distance between any two such points in the multi-dimensional space can be used as an indication of the similarity of the two respective data records. This information may be organized in the form of a hierarchical nearest neighbor graph such that data records are associated to respective nodes in the graph based on their respective embeddings. Note that, if the data records have more than one embedding for more than one data type (e.g., an embedding for text and an embedding for an image), then the generated similarity model may include separate sub-models for each type of embedding (e.g., a first sub-model may be generated based on the embeddings of the text of the data records and a second sub-model may be generated based on the embeddings of the images of the data records). In one example embodiment, each of these sub-models may be a separate hierarchical nearest neighbor graph.

The process then determines whether it is time to repeat the batch process (step 1004). In the preferred embodiment, the batch process is repeated infrequently because of cost in terms of money and/or computing resources. For example, the batch process may be repeated periodically (e.g., once a day, once every N days, once a week, etc.). As another example, the batch process may be performed aperiodically, e.g., in response to a triggering event (e.g., after M new or updated data records are added to a list of data records to be processed). As another example, the batch process may be performed based on a combination of periodic and aperiodic triggers (e.g., repeated at the earlier of: (a) a time at which there are M new or updated data records to be processed or (b) N days).

If it is not time to repeat the batch process (step 1004, NO), the process repeats step 1004 (i.e., waits) until it is time to repeat the batch process. Once it is time to repeat the batch process (step 1004, YES), new data records added to the collection since the last time that steps 1000 and 1002 were performed and, optionally, existing data records in the collection that have been updated since the last time that steps 1000 and 1002 were performed (i.e., updated data records) are identified (step 1006). Optionally, as described below with respect to FIG. 2, embeddings of new data records and optionally updated data records may be generated during the search procedure of FIG. 2, in which case any such cached embeddings stored for the new and updated data records in step 1006 may be deleted from cache (step 1008). Step 1000 is repeated to generate embeddings for the new data records and, optionally, the updated data records. Step 1002 is then repeated to update the similarity model to include the new data records and to reflect the new embeddings for the updated data records.

Figure 2:
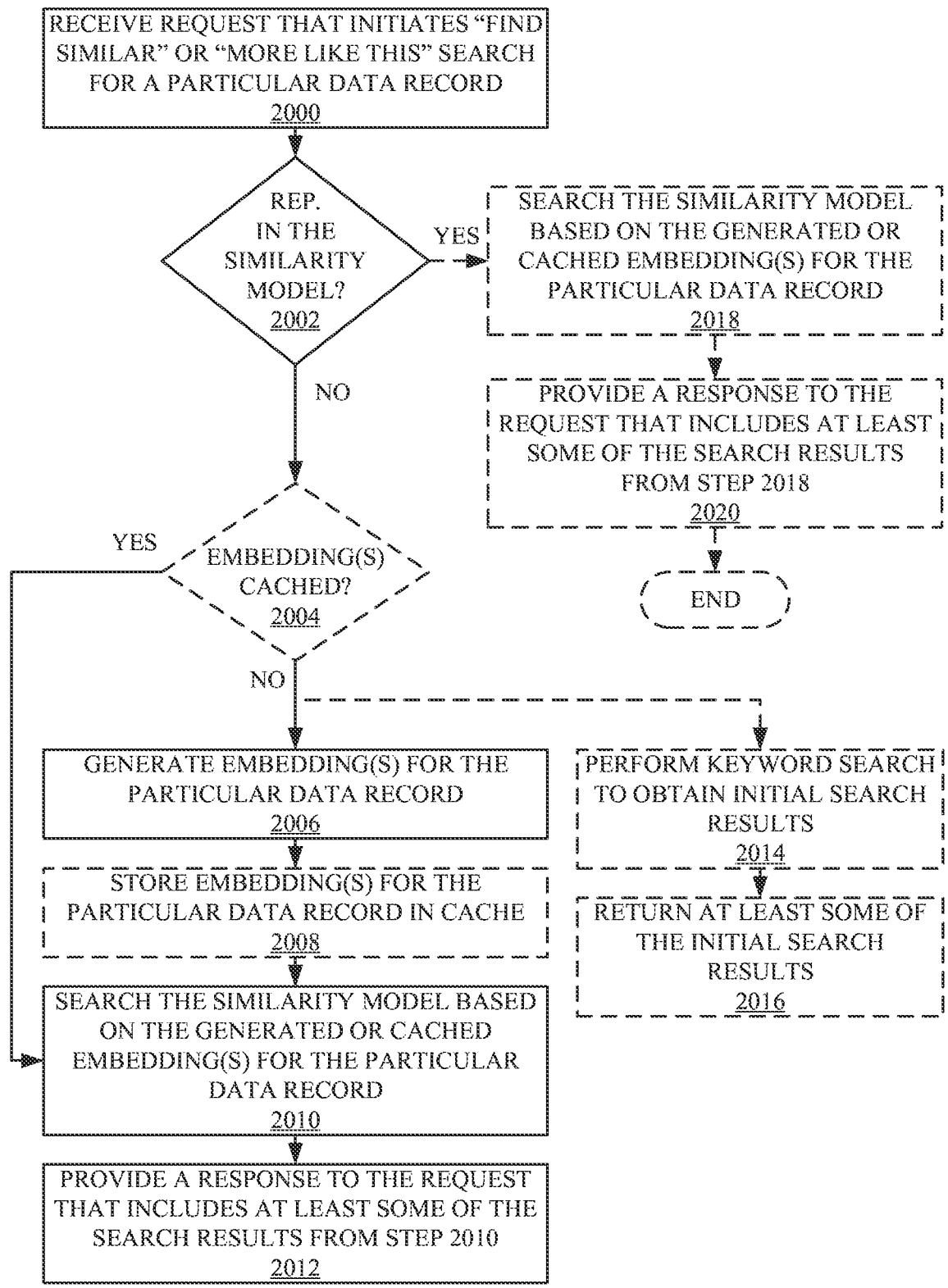
FIG. 2 is a flowchart that illustrates a computer-implemented embedding-based "find similar" or "more like this" search process, in accordance with an embodiment of the present disclosure.

FIG. 2 is a flowchart that illustrates a computer-implemented embedding-based "find similar" or "more like this" search process, in accordance with an embodiment of the present disclosure. Optional steps are represented by dashed lines/boxes. The procedure of FIG. 2 may be implemented by a server computer, implemented by multiple server computers that operate together to provide the described functionality, or implemented as one or more virtual machines or the like that execute on any suitable hardware platform.

As illustrated, a "find similar" or "more like this" search is initiated for a particular data record in the collection (step 2000). The particular data record may be a either: a data record that is already represented in the similarity model (i.e., a data record that has already been processed by the batch process of steps 1000 and 1002 of FIG. 1 and for which no subsequent update has been made), a new data record added to the collection since the last time that the batch process of steps 1000 and 1002 of FIG. 1 were performed, or optionally an updated data record (i.e., a data record for which a previous version of the data record is already represented in the similarity model but the data record has been updated since it was processed by the batch process of steps 1000 and 1002 of FIG. 1). Note that, in the case of an updated data record, the updated data record is not represented in the similarity model; rather, a previous version of the data record is represented in the similarity model.

The process checks whether the particular data record is included in the similarity model (step 2002). As discussed above, the particular data record is not included in the similarity model if the data record is a new or updated data record. If the particular data record is not included in the similarity model (step 2002, NO), optionally, a check is performed to determine whether an embedding(s) for the particular data record (i.e., the new or updated data record) is (are) cached (step 2004). If so, the process proceeds to step 2010.

If an embedding(s) for the particular data record is (are) not cached, at least one embedding for the particular data record is generated (step 2006). The at least one embedding for the particular data record is preferably generated using the same AI model(s) used to generate corresponding embeddings of the other data records in the collection in step 1000 of FIG. 1. The at least one embedding generated for the particular data record is stored in cache (step 2008).

The similarity model is searched based on the at least one embedding generated for the particular data record in step 2006 or retrieved from cache to identify a subset of the collection of data records that are similar to the particular data record for which the search was initiated (step 2010). In this context, data records are "similar" if the corresponding embeddings match to at least a threshold degree (e.g., are within a certain threshold distance from one another in multi-dimensional space). For example, in a case where the embeddings correspond to points in a multi-dimensional space, the subset may include a subset of data records in the collection for which the corresponding embeddings are less than a threshold distance from the embedding of the particular data record in the multi-dimensional space. As another example, in a case where the embeddings correspond to points in a multi-dimensional space, the subset may include a certain number (R) of the data records having the R closest embeddings to the embedding of the particular data record in the multi-dimensional space.

The process then returns at least some of the subset of the data records in the collection identified via the search of step 2010 (step 2012). These search results may be provided to another device or system (e.g., communicated to another device or system via a network or combination of networks such as, e.g., the Internet) where the search results are presented to a user, e.g. a user from which user input was received that initiated the search.

In some embodiments, the data records in the collection include data of a single data type (e.g., only text or only image), and the at least one embedding (cached or generated in step 2006) of the particular data record consists of an embedding of the data of that one type included in the particular data record. In this case, the search performed in step 2010 is a search of the similarity model based on the embedding of the particular data record for this one data type.

In some other embodiments, the data records in the collection include data of more than one data type (e.g., both a text component and an image component), and the similarity model is based on embeddings of the data records for all of the data types (e.g., based on both embeddings of text and embeddings of images). In this case, the at least one embedding (cached or generated in step 2006) of the particular data record includes embeddings of all of the data types (e.g., both an embedding of the text component of the particular data record and an embedding of an image component of the particular data record), and the search performed in step 2010 is a search of the similarity model based on these embeddings of the particular data record.

In some other embodiments, the data records in the collection include data of more than one data type (e.g., both a text component and an image component), and the similarity model includes separate sub-models for each data type (e.g., a first sub-model based on text embeddings and a second sub-model based on image embeddings). In this case, the at least one embedding (cached or generated in step 2006) of the particular data record includes either: (a) embeddings of all of the data types (e.g., both an embedding of the text component of the particular data record and an embedding of an image component of the particular data record) or (b) an embedding of a subset (e.g., one) of the data types (e.g., only a text embedding or only an image embedding). In the case of (a), the search performed in step 2010 is a search of the separate sub-models based on corresponding embeddings of the particular data record. For example, if there are both text embeddings and image embeddings, the search may include a first search of a first sub-model (which is based on text embeddings) based on the text embedding for the particular data record and a second search of a second sub-model (which is based on image embeddings) based on the image embedding for the particular data record. In the case of (b), the search performed in step 2010 is a search of a subset of the sub-models based on corresponding embedding(s) for the subset of data types. For example, if there are both text embeddings and image embeddings, the search may include either: (i) a search of a first sub-model (which is based on text embeddings) based on the text embedding for the particular data record or (ii) a second search of a second sub-model (which is based on image embeddings) based on the image embedding for the particular data record.

It should be noted that, in some scenarios, the data records may include two or more data instances of the same data type (e.g., two or more images where each image is a separate "data instance" of the image data type) and the similarity model can handle multiple embeddings of the same data type for a single data record (e.g., via multiple entries for the same data record in the hierarchical nearest neighbor graph). In this case, the at least one embedding for the particular data record used for the search in step 2010 may include separate embeddings for each data instance of the same data type or may include a single embedding of one of the data instances of the same data type.

As an example, each data record in the collection may include both a text component and an image component. In this case, separate embeddings may be generated during the batch process of FIG. 1 for the text component and each image to provide a set of embeddings for each data record. In this case, some example implementations of the similarly model generated in step 1002 of FIG. 1 and the search of step 2010 are as follows:

In one example implementation, the similarity model is a single model (e.g., a single hierarchical nearest neighbor graph), where the degree of similarity between two data records is represented in the model as some function (e.g., average, sum, weighted sum, etc.) of the distances between corresponding embeddings of the two data records. For example, a first distance between the text embeddings and a second distance between the image embeddings of two data records may be normalized and then averaged or summed to provide a combined/final distance (degree of similarity) between the two data records. This type of representation of the degree of similarity between two data records may be used for both generating the similarity model in step 1002 of FIG. 1 and the search in step 2010 of FIG. 2.

In another example implementation, the similarity model includes separate sub-models (e.g., separate hierarchical nearest neighbor graphs) for text-based embeddings and image-based embeddings. Then, when finding search results for the particular data record, the search results may include a set or subset of nearest neighbors in the text-based model, a set or subset of nearest neighbors in the image-based model, or a set (or subset of) data records that are nearest neighbors in both the text-based model and the image-based model.

In another example implementation, there may be separate text-based and image-based embeddings generated by the batch process of FIG. 1 but, for live-embedding generation in the process of FIG. 2, only one of the two types of embeddings may be used (e.g., the one that performs the best, e.g., provides the best results, or the one that can be generated the fastest).

Note that the generation of the at least one embedding for the particular data record in step 2006 takes an amount of time that may, in some cases, be longer than desired by the user waiting for the search results. Thus, optionally, in parallel with or prior to performing step 2006, a keyword search is performed to identify an initial subset of the data records in the collection that are similar to the particular data record (step 2014). More specifically, in this case, the data records include text, and one or more keywords are extracted from the particular data record, and these extracted keywords are used as a query to search the text of the other data records in the collection using, e.g., any conventional keyword searching technique. The process then returns at least some of the subset of the data records in the collection identified via the search of step 2014 (step 2016). These search results may be provided to another device or system (e.g., communicated to another device or system via a network or a combination of networks such as, e.g., the Internet) where the search results are presented to a user, e.g. a user from which user input was received that initiated the search. Note that the search results of step 2012 may supplement or replace the initial search results of step 2016. Note that steps 2014 and 2016 are completed prior to completion of step 2006 in which the at least one embedding of the particular data record is generated.

Returning to step 2002, if the particular data record is included in the similarity model (step 2002, YES), the search is performed using the similarity model, which already includes information regarding which of the data records in the collection are similar to the particular data record (step 2018). The process then returns at least some of the subset of the data records in the collection identified via the search of step 2018 (step 2020). These search results may be provided to another device or system (e.g., communicated to another device or system via a network or a combination of networks such as, e.g., the Internet) where the search results are presented to a user, e.g. a user from which user input was received that initiated the search.

Note that the process of FIG. 2 is repeated for each received request for a search for the same and different data records.

Figure 3:
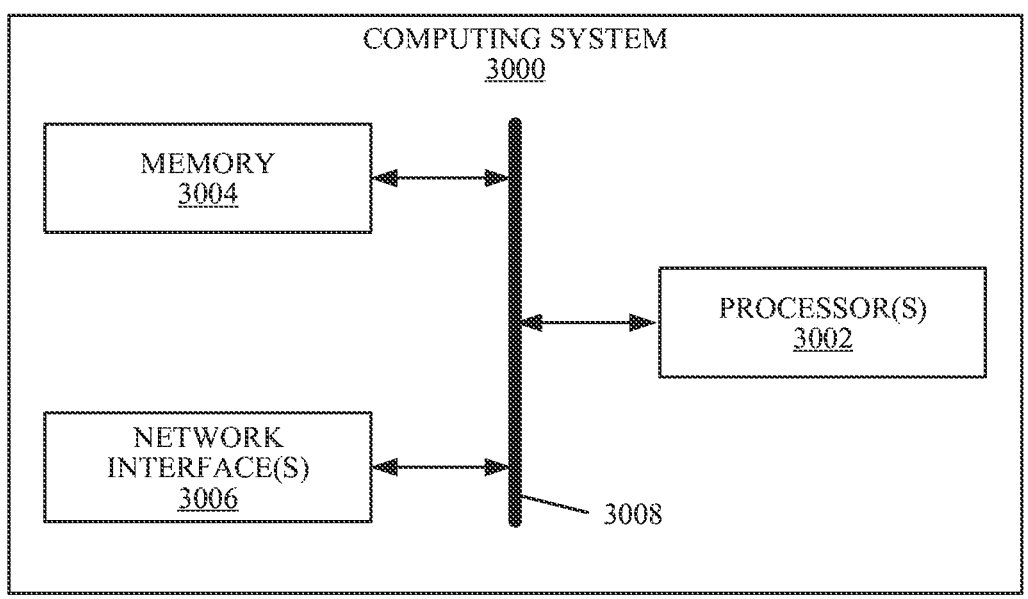
FIG. 3 is a schematic block diagram of one example embodiment of a computing system that may implement the process of FIG. 1 and/or the process of FIG. 2.

FIG. 3 is a schematic block diagram of one example embodiment of a computing system 3000 that may implement the process of FIG. 1 and/or the process of FIG. 2. As illustrated, the computing system 3000 includes one or more processors 3002 (e.g., Central Processing Units (CPUs), Application Specific Integrated Circuits (ASICs), Field Programmable Gate Arrays (FPGAs), and/or the like), memory 3004, and one or more network interfaces 3006 (e.g., a Wi-Fi network interface, a cellular (e.g., Fifth Generation (5G)) interface, an Ethernet network interface, or the like), connected via a bus 3008 or the like. The processors 3002 are also referred to herein as processing circuitry. In some embodiments, functionality corresponding to the process of FIG. 1 and/or the process of FIG. 2 described above is implemented in software that is stored in the memory 3004 and executed by the processor(s) 3002 to thereby cause the computing system 3000 to perform the process of FIG. 1 and/or the processing of FIG. 2.

In some embodiments, a computer program including instructions which, when executed by at least one processor, causes the at least one processor to carry out the process of FIG. 1 and/or the process of FIG. 2, according to any of the embodiments described herein is provided. In some embodiments, a carrier comprising the aforementioned computer program product is provided. The carrier is one of an electronic signal, an optical signal, a radio signal, or a computer-readable storage medium (e.g., a non-transitory computer-readable medium).

Now, a description of an example e-commerce platform in which embodiments of the present disclosure may be implemented will be described. For example, in one example embodiment, data records in the collection referred to above are product webpages of an e-commerce store provided via the e-commerce platform described below, and the process of FIG. 1 and/or the process of FIG. 2 performed by the e-commerce platform 100 as a feature of an online store 138 to enable a customer to search for other products offered by the merchant that are similar to a particular product.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 4:
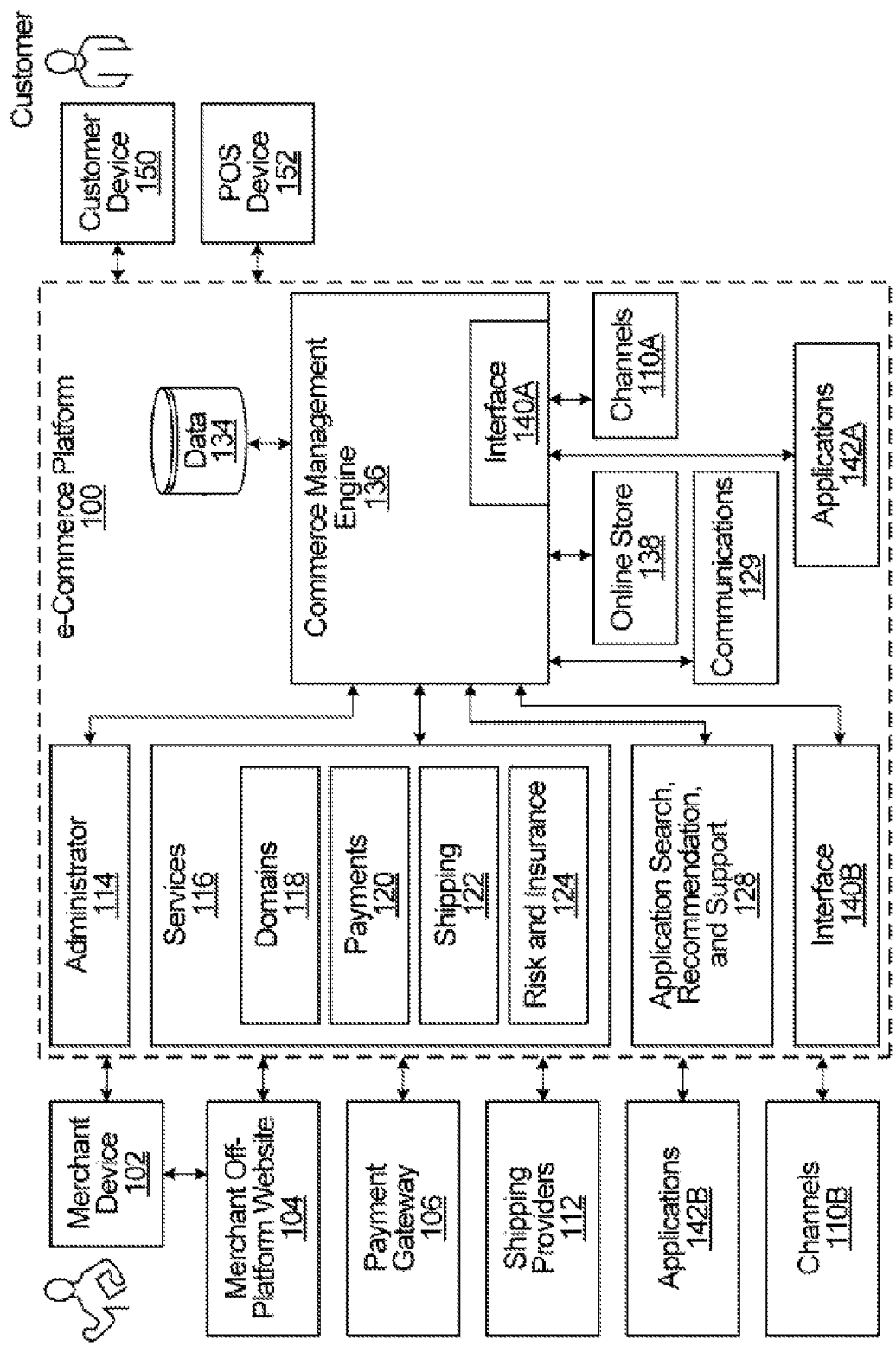
FIG. 4 illustrates an example e-commerce platform, according to one embodiment.

FIG. 4 illustrates an example e-commerce platform 100, according to one embodiment. The e-commerce platform 100 may be exemplary of the e-commerce platform 105 described with reference to FIG. 5. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 4, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like).

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colours, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 5:
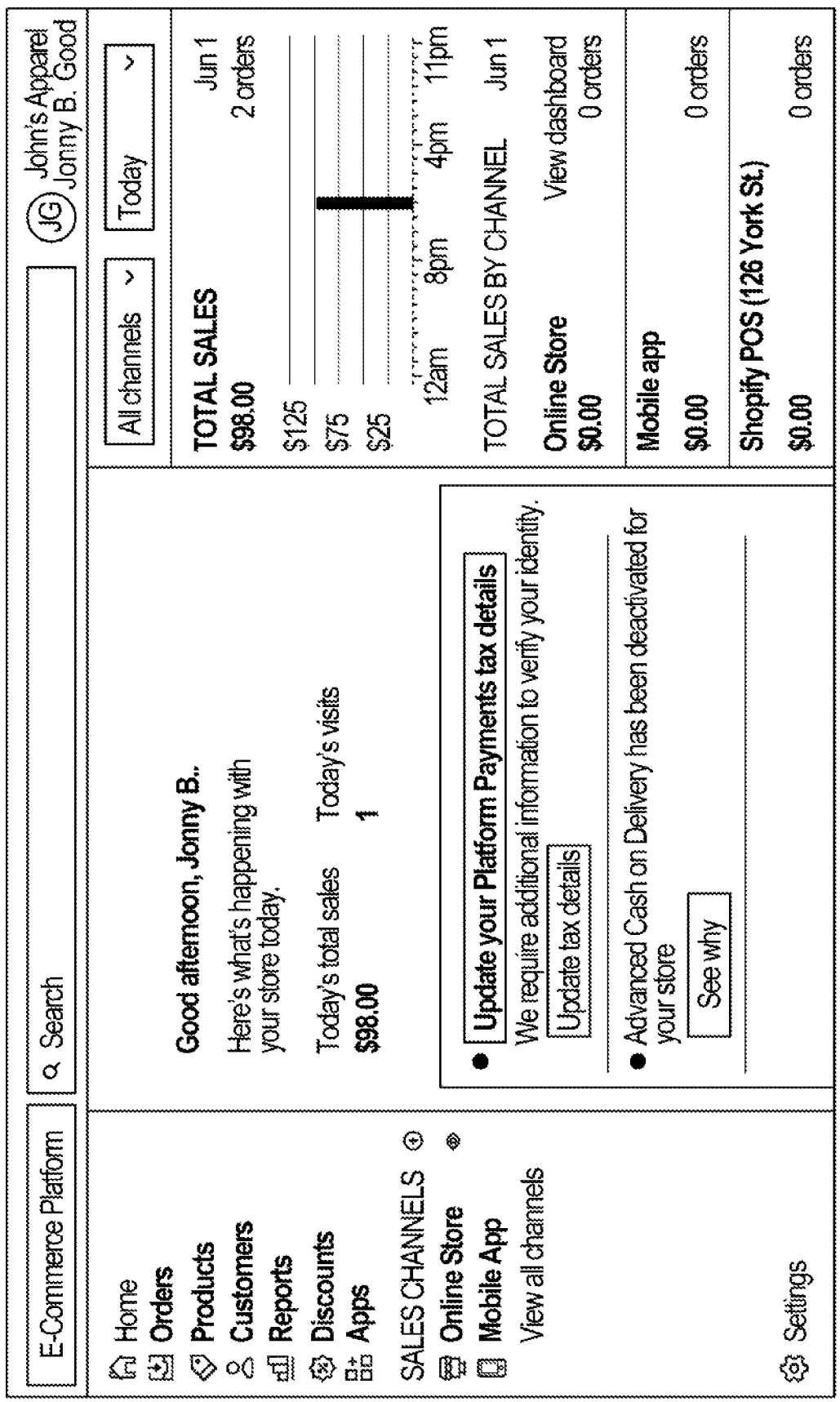
FIG. 5 depicts a non-limiting embodiment for a home page of an administrator.

FIG. 5 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 5. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 4, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the case of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and colour, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
receiving a request to find data records in a collection of data records that are similar to a particular data record in the collection of data records;
determining that the particular data record is not included in a model comprising data indicative of similar data records among the collection of data records based on embeddings of data records in the collection of data records, wherein an embedding of a data record is a vector representation of one or more components of the data record;
responsive to determining that the particular data record is not included in the model:
generating at least one embedding of the particular data record; and
searching the model for a subset of the collection of data records that are similar to the particular data record, based on the at least one embedding of the particular data record; and providing a response to the request, the response comprising one or more data records from the subset of the collection of data records that are similar to the particular data record.

2. The computer-implemented method of claim 1, further comprising caching the at least one embedding of the particular data record.

3. The computer-implemented method of claim 2, further comprising:
receiving a second request to find data records in the collection of data records that are similar to the particular data record;
determining that the particular data record is not included in the model;
responsive to determining that the particular data record is not included in the model:
determining that the at least one embedding of the particular data record is cached; and
responsive to determining that the at least one embedding of the particular data record is cached, searching the model for a subset of the collection of data records that are similar to the particular data record, based on the at least one cached embedding of the particular data record; and
providing a response to the second request, the response comprising one or more data records from the subset of the collection of data records that are similar to the particular data record.

4. The computer-implemented method of claim 3, further comprising:
performing a batch process that generates embeddings for a set of data records that are either new to the collection of data records or updated versions of data records already included in the collection of data records and updates the model to include the set of data records based on the embeddings generated for the data records in the set of data records; and
deleting the at least one embedding of the particular data record from cache, in association with performing the batch process.

5. The computer-implemented method of claim 1, further comprising, responsive to determining that the particular data record is not included in the model:
performing a keyword search to identify an initial subset of the collection of data records that, based on the keyword search, have at least a threshold degree of similarity to the particular data record; and
providing an initial response to the request, the initial response comprising one or more of the initial subset of the collection of data records that, based on the keyword search, have at least a threshold degree of similarity to the particular data record;
wherein performing the keyword search and providing the initial response to the request are completed prior to completion of generating the at least one embedding of the particular data record.

6. The method of claim 1, wherein the model is a hierarchical nearest neighbor graphs that indicates, based on the embeddings of the data records in the collection of data records, nearest neighbors for each of the data records in the collection of data records.

7. The computer-implemented method of claim 1, wherein each data record in the collection of data records and the particular data record comprises one or more data components, the one or more data components comprising a text component, an image component, or both a text component and an image component.

8. The computer-implemented method of claim 1, wherein each data record in the collection of data records and the particular data record comprises both a text component and an image component.

9. The computer-implemented method of claim 8, wherein:
the model is a first model comprising data indicative of similar data records among the collection of data records based on embeddings of the text components of data records in the collection of data records; and
the at least one embedding of the particular data record consists of an embedding of the text component of the particular data record.

10. The computer-implemented method of claim 8, wherein:
the model is a first model comprising data indicative of similar data records among the collection of data records based on embeddings of the image components of data records in the collection of data records; and
the at least one embedding of the particular data record consists of an embedding of the image component of the particular data record.

11. The computer-implemented method of claim 8, wherein:
the model is a first model comprising data indicative of similar data records among the collection of data records based on both embeddings of the image components of data records in the collection of data records and embeddings of the text components of data records in the collection of data records; and
the at least one embedding of the particular data record consists of both an embedding of the image component of the particular data record and an embedding of the text component of the particular data record.

12. The computer-implemented method of claim 8, wherein:
the model comprises a first sub-model comprising data indicative of similar data records among the collection of data records based on embeddings of the text components of data records in the collection of data records and a second sub-model comprising data indicative of similar data records among the collection of data records based on embeddings of the image components of data records in the collection of data records;
the at least one embedding of the particular data record consists of an embedding of the text component of the particular data record; and
searching the model for the subset of the collection of data records that are similar to the particular data record comprises searching the first sub-model, based on the embedding of the text component the particular data record.

13. The computer-implemented method of claim 8, wherein:
the model comprises a first sub-model comprising data indicative of similar data records among the collection of data records based on embeddings of the text components of data records in the collection of data records and a second sub-model comprising data indicative of similar data records among the collection of data records based on embeddings of the image components of data records in the collection of data records;
the at least one embedding of the particular data record consists of an embedding of the image component of the particular data record; and
searching the model for the subset of the collection of data records that are similar to the particular data record comprises searching the second sub-model, based on the embedding of the image component the particular data record.

14. The computer-implemented method of claim 8, wherein:
the model comprises a first sub-model comprising data indicative of similar data records among the collection of data records based on embeddings of the text components of data records in the collection of data records and a second sub-model comprising data indicative of similar data records among the collection of data records based on embeddings of the image components of data records in the collection of data records;
the at least one embedding of the particular data record consists of both an embedding of the text component of the particular data record and an embedding of the image component of the particular data record; and
searching the model for the subset of the collection of data records that are similar to the particular data record comprises both searching the first sub-model based on the embedding of the text component the particular data record and searching the second sub-model based on the embedding of the image component the particular data record.

15. A computing system comprising:
processing circuitry; and
memory comprising instructions executed by the processing circuitry whereby the computing system is operable to:
receive a request to find data records in a collection of data records that are similar to a particular data record in the collection of data records;
determine that the particular data record is not included in a model comprising data indicative of similar data records among the collection of data records based on embeddings of data records in the collection of data records, wherein an embedding of a data record is a vector representation of one or more components of the data record;
responsive to determining that the particular data record is not included in the model:
generate at least one embedding of the particular data record; and
search the model for a subset of the collection of data records that are similar to the particular data record, based on the at least one embedding of the particular data record; and
provide a response to the request, the response comprising one or more data records from the subset of the collection of data records that are similar to the particular data record.

16. The computing system of claim 15, wherein, via execution of the instructions by the processing circuitry, the computing system is further operable to cache the at least one embedding of the particular data record.

17. The computing system of claim 16, wherein, via execution of the instructions by the processing circuitry, the computing system is further operable to:
receive a second request to find data records in the collection of data records that are similar to the particular data record;
determine that the particular data record is not included in the model;
responsive to determining that the particular data record is not included in the model:
determine that the at least one embedding of the particular data record is cached; and
responsive to determining that the at least one embedding of the particular data record is cached, search the model for a subset of the collection of data records that are similar to the particular data record, based on the at least one cached embedding of the particular data record; and
provide a response to the second request, the response comprising one or more data records from the subset of the collection of data records that are similar to the particular data record.

18. The computing system of claim 17, wherein, via execution of the instructions by the processing circuitry, the computing system is further operable to:
perform a batch process that generates embeddings for a set of data records that are either new to the collection of data records or updated versions of data records already included in the collection of data records and updates the model to include the set of data records based on the embeddings generated for the data records in the set of data records; and
delete the at least one embedding of the particular data record from cache, in association with performing the batch process.

19. The computing system of claim 15, wherein, via execution of the instructions by the processing circuitry, the computing system is further operable to, responsive to determining that the particular data record is not included in the model:
perform a keyword search to identify an initial subset of the collection of data records that, based on the keyword search, have at least a threshold degree of similarity to the particular data record; and
provide an initial response to the request, the initial response comprising one or more of the initial subset of the collection of data records that, based on the keyword search, have at least a threshold degree of similarity to the particular data record;
wherein performing the keyword search and providing the initial response to the request are completed prior to completion of generating the at least one embedding of the particular data record.

20. A non-transitory computer readable medium comprising instructions executable by processing circuitry of a computing system whereby the computing system is operable to:
receive a request to find data records in a collection of data records that are similar to a particular data record in the collection of data records;
determine that the particular data record is not included in a model comprising data indicative of similar data records among the collection of data records based on embeddings of data records in the collection of data records, wherein an embedding of a data record is a vector representation of one or more components of the data record;
responsive to determining that the particular data record is not included in the model:
generate at least one embedding of the particular data record; and
search the model for a subset of the collection of data records that are similar to the particular data record, based on the at least one embedding of the particular data record; and
provide a response to the request, the response comprising one or more data records from the subset of the collection of data records that are similar to the particular data record.

* * * * *